US006637755B2

(12) United States Patent
Chen et al.

(10) Patent No.: US 6,637,755 B2
(45) Date of Patent: Oct. 28, 2003

(54) CHUCK DEVICE FOR MINIATURE TOOL BITS

(75) Inventors: Tsai-Ching Chen, No. 13-1, Dong Shih Hsiang, Lu Gang Chen, Chang Hua Hsien (TW); Chiu-Man Chang-Kao, Taichung Hsien (TW)

(73) Assignee: Tsai-Ching Chen, Chang Hua Hsien (TW)

( * ) Notice: Subject to any disclaimer, the term of this patent is extended or adjusted under 35 U.S.C. 154(b) by 0 days.

(21) Appl. No.: 10/104,118

(22) Filed: Mar. 22, 2002

(65) Prior Publication Data

US 2003/0178794 A1 Sep. 25, 2003

(51) Int. Cl.[7] ........................ B23B 31/107; B23B 31/22
(52) U.S. Cl. ............................ 279/22; 279/30; 279/905
(58) Field of Search .............................. 279/22, 30, 75, 279/905; 81/438

(56) References Cited

U.S. PATENT DOCUMENTS 1,124,981 A * 1/1915 Weaver ....................... 279/75
5,188,378 A * 2/1993 Erlenkeuser ................. 279/22
5,934,384 A * 8/1999 Wang ........................... 279/75
6,135,462 A * 10/2000 Robison ....................... 279/22
6,270,085 B1 * 8/2001 Chen et al. ................... 279/22
6,311,989 B1 * 11/2001 Rosanwo ...................... 279/75
6,325,393 B1 * 12/2001 Chen et al. ................... 279/22

* cited by examiner

*Primary Examiner*—Steven C. Bishop
(74) *Attorney, Agent, or Firm*—Alan D. Kamrath; Rider Bennett LLP

(57) ABSTRACT

A chuck device includes a socket, a ball, a first ring, an elastic element, a sleeve, a second ring and a spindle. The socket includes a first chamber defined therein. The first chamber includes a number of slots for receiving the corners. The socket includes a hole defined therein in communication with one of the corner-receiving slots. The ball is received in the hole for engagement with the recess defined in one of the corners of the miniature tool bit. The first ring is formed around the socket. The elastic element is mounted on the socket so as to be compressed between the ring and the annular rib, thus biasing the sleeve. The sleeve includes an annular groove defined in and an annular rib formed on an internal surface thereof. The sleeve is mounted on the socket. The second ring is connected with the sleeve for engagement with the first ring, thus retaining the sleeve on the socket. The spindle is connected with the socket.

13 Claims, 8 Drawing Sheets

CHUCK DEVICE FOR MINIATURE TOOL BITS

BACKGROUND OF INVENTION

1. Field of Invention

The present invention relates to a chuck device for engagement with miniature tool bits.

2. Related Prior Art

In both U. S. Pat. Nos. 6,270,085 and 6,325,393, a chuck device is disclosed for engagement with tool bits. As shown in these patents, a tool bit 80 includes a shank and an annular groove 82 defined in the shank for engagement with a ball of the chuck device. However, such a configuration is not suitable for a miniature tool bit because such an annular groove seriously reduces cross-sectional area and therefore strength of such a miniature tool bit. Instead of an angular groove, a recess is defined in each of six corners of such a miniature tool bit. To match such a miniature tool bit, a new chuck device is needed.

SUMMARY OF INVENTION

It is the primary object of the present invention to provide a chuck device for engagement with miniature tool bits each including a number of corners each defining a recess.

The chuck device includes a socket, at least one ball, a first ring, an elastic element, a sleeve, a second ring and a spindle. The socket includes a chamber defined therein. The chamber includes a number of slots for receiving the corners of such a miniature tool bit. The socket includes at least one hole defined therein in communication with at least one of the corner-receiving slots. The at least one ball is received in the hole for engagement with the recess defined in at least one of the corners of the miniature tool bit. The first ring is mounted on the socket. The elastic element is mounted on the socket. The sleeve includes an annular groove defined in and an annular rib formed on an internal surface thereof. The sleeve is mounted on the socket. The elastic element is compressed between the ring and the annular rib, thus biasing the sleeve. The second ring is connected with the sleeve for engagement with the first ring, thus retaining the sleeve on the socket. The spindle is connected with the socket.

The socket may include two holes in communication with two of the slots. A ball is received in each of the holes.

The first ring may be a C-ring received in an annular groove defined in an external surface of the socket.

The second ring may be pressed into the sleeve.

The socket may include a second chamber defined therein for receiving the spindle.

The second chamber may be in communication with the first chamber. Thus, a pusher may be received in the first and second chambers for pushing the miniature tool bit. A second elastic element may be received in the second chamber for biasing the pusher.

The pusher may include a first recess defined therein for engagement with the miniature tool bit.

The pusher may include a second recess defined therein for engagement with the second elastic element.

The socket may include an annular shoulder formed between the first and second chambers. The pusher includes a third ring formed thereon for engagement with the annular shoulder, thus avoiding the pusher escaping from the second chamber.

The third ring may be a C-ring received in an annular groove defined in the pusher.

The spindle may include a first section received in the second chamber and a recess defined in the first section of the spindle for engagement with the second elastic element.

Other objects, advantages, and novel features of the invention will become more apparent from the following detailed description when taken in conjunction with the accompanying drawings.

BRIEF DESCRIPTION OF DRAWINGS

The present invention is described in relation to embodiments as shown in the attached drawings wherein.

DETAILED DESCRIPTION OF PREFERRED EMBODIMENT

As mentioned, the present invention is related to a chuck device for engagement with miniature tool bits. Therefore, before the chuck device is described, a miniature tool bit 50 is described referring to FIGS. 4 to 8 in view of an ordinary tool bit (not shown). An ordinary tool bit includes a tip and a shank of a hexangular configuration. An annular groove is defined in the shank of the ordinary tool bit for engagement with a ball of a chuck device. Like the ordinary tool bit, the miniature tool bit 50 includes a tip and a shank of a hexangular structure. The shank of the miniature tool bit 50 includes six corners 53. Unlike the ordinary tool bit, no angular groove is defined in the miniature tool bit 50. Instead, a recess 52 is defined in each of the corners 53 of the miniature tool bit 50. At least one of the recesses 52 will be engaged with a ball of a chuck device. The miniature tool bit 50 is formed with such a structure in order not to seriously sacrifice its already small cross-sectional area and therefore its strength.

Figure 1:
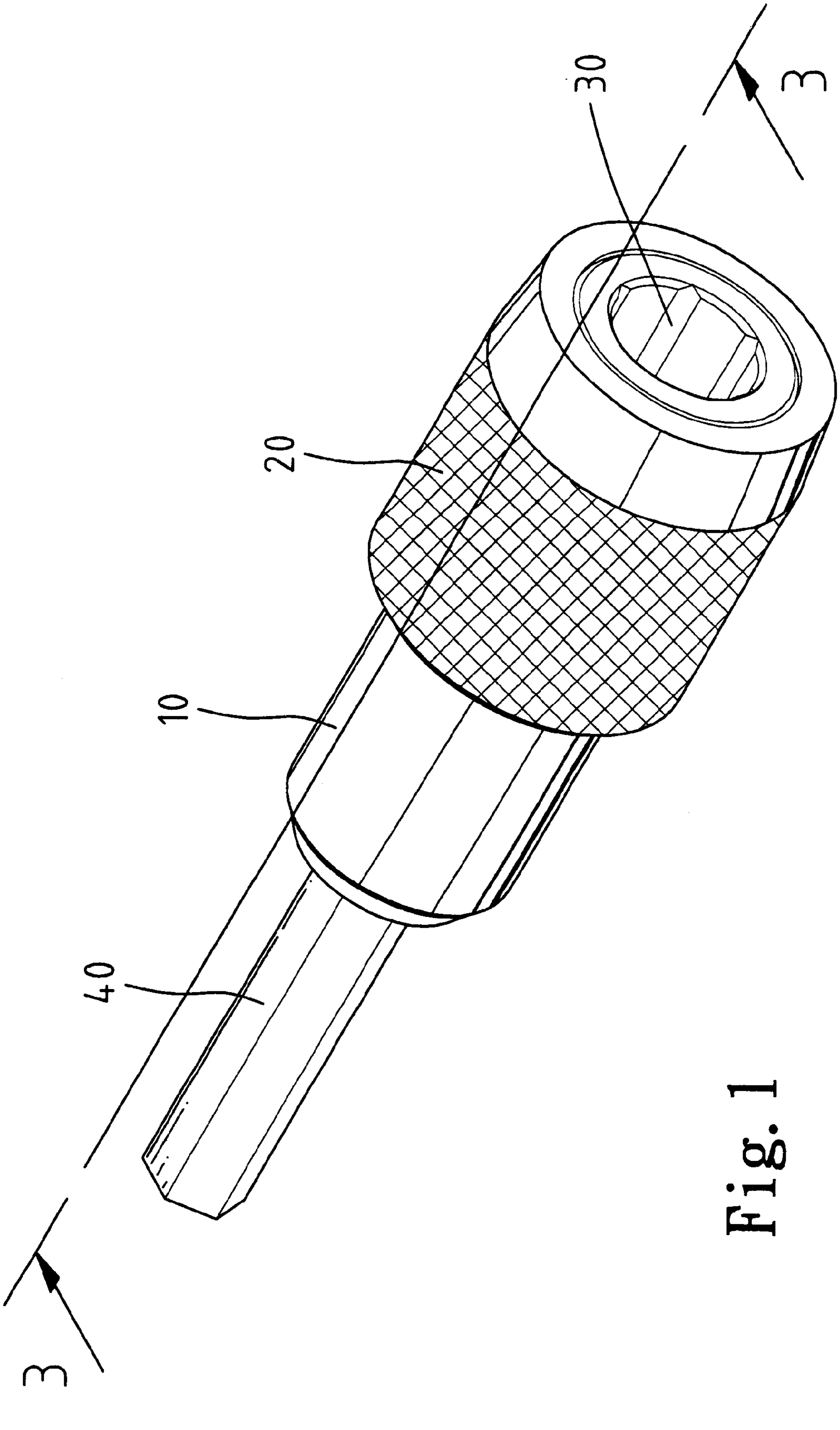
FIG. 1 is a perspective view of a chuck device for tool bits in accordance with the present invention.
Figure 2:
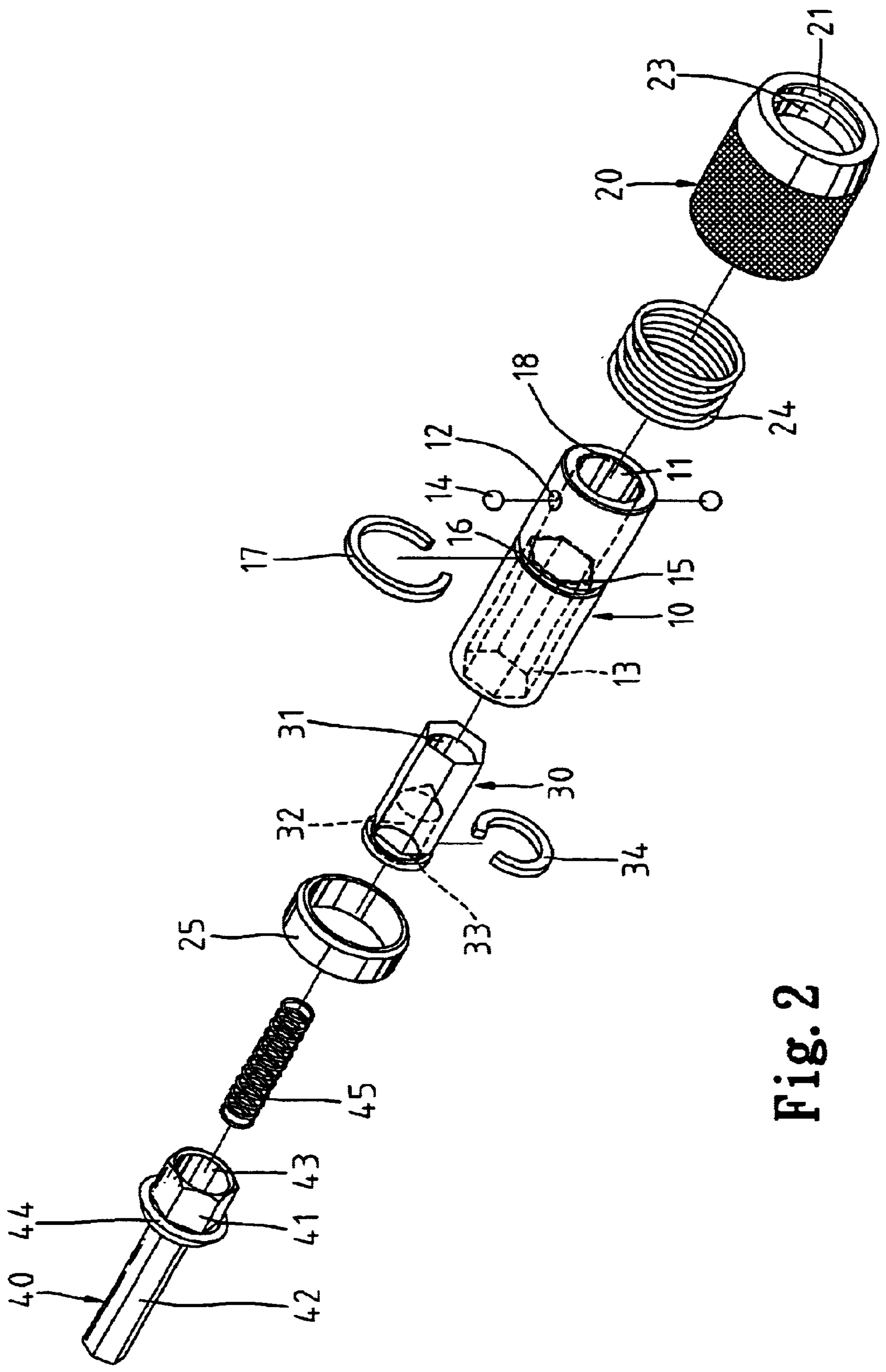
FIG. 2 is an exploded perspective view of FIG. 1.
Figure 3:
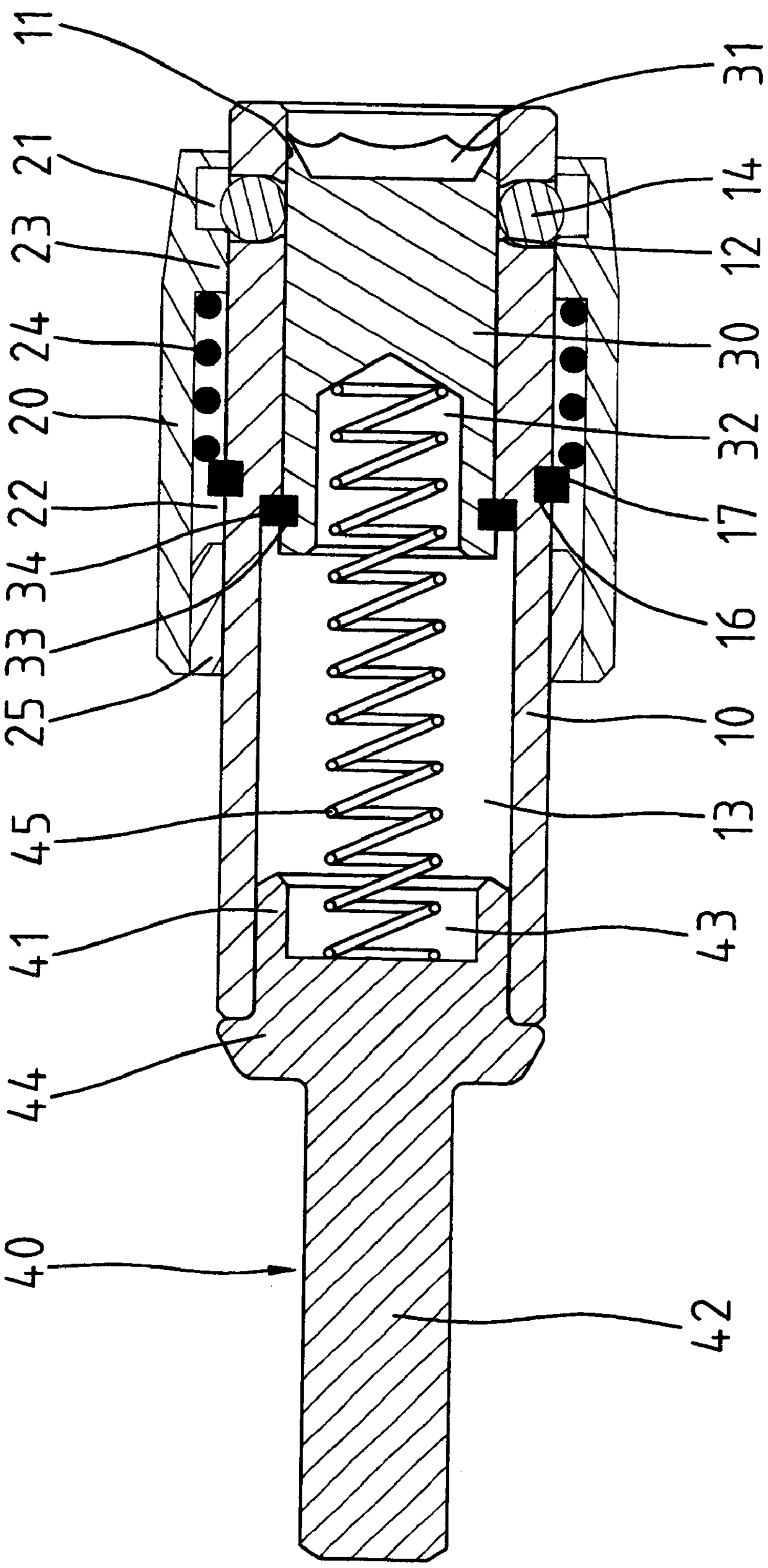
FIG. 3 is a cross-sectional view taken along a line 3—3 in FIG. 1.

The chuck device for miniature tool bits according to the present invention will be described referring to the drawings and initially to FIGS. 1 to 3. The chuck device includes a socket 10, a sleeve 20, a pusher 30 and a spindle 40. The spindle 40 may be connected with a handle (not shown) or a driving element of a pneumatic or electric device (not shown).

Elements and features related to engagement of the chuck device with the miniature tool bit 50 will now be described. The socket 10 includes a tool-engaging section and a spindle-engaging section. A chamber 11 is defined in the tool-engaging section of the socket 10. Further referring to FIG. 6, the chamber 11 is surrounded by a substantially cylindrical wall (not numbered) that defines six corner-receiving slots 18 for receiving the corners 53 of the miniature tool bit 50. Thus, the socket 10 can drive the miniature tool bit 50.

The socket 10 includes two holes 12 defined in the tool-engaging section thereof in communication with two of the corner-receiving slots 18. A ball 14 is received in each of the holes 12 so that it can be engaged with one of the recesses 52 defined in the miniature tool bit 50 in order to lock the tool bit 50 to the chuck device. The socket 10 includes an annular groove 16 defined in an external surface thereof. A C-ring 17 is received in the annular groove 16.

A sleeve 20 includes an annular groove 21 defined in an internal surface thereof and an annular rib 23 formed on the internal surface thereof. The annular groove 21 and the annular rib 23 are arranged next to each other.

An elastic element 24 and the sleeve 20 are mounted on the tool-engaging section of the socket 10. The elastic element 24 is compressed between the C-ring 17 and the annular rib 23 of the sleeve 20. Thus, the sleeve 20 is biased by the elastic element 24. A ring 25 is securely pressed into the sleeve 20. The ring 25 can abut the C-ring 17 in order to retain the sleeve 20 on the socket 10.

Now, elements and features related to automatic release of the miniature tool bit 50 from the chuck device will be described. The socket 10 includes a chamber 13 defined in the spindle-engaging section thereof. The chamber 11 is dimensioned smaller than the chamber 13, thus forming an annular shoulder 15 on the internal surface of the socket 10 between the chambers 11 and 13.

The pusher 30 includes a first recess 31 defined in a first end thereof, a second recess 32 defined in a second end thereof, an annular groove 33 defined in an external surface thereof near the second end thereof. The first recess 31 is in compliance with an end of the miniature tool bit 50. A C-ring 34 is received in the annular groove 33 of the pusher 30. An elastic element 45 is received in the chamber 13 so that its first end is received in the second recess 32 of the pusher 30.

The spindle 40 includes a first section 41 in which a recess 43 is defined. The first section 41 of the spindle 40 is securely pressed into the chamber 13. A second end of the elastic element 45 is received in the recess 43. The elastic element 45 is compressed between the pusher 30 and the spindle 40.

Elements and features related to engagement of the chuck device with the handle or the driving element of the pneumatic or electric device will now be described. The first section 41 of the spindle 40 is shaped corresponding to the chamber 13 so that the socket 10 can be driven via the spindle 40. The spindle 40 includes a stop 44 formed next to the first section 41. The stop 44 of the spindle 40 is capable of preventing further insertion of the first section 41 of the spindle 40 into the chamber 13. The spindle 40 includes a second section 42 projecting from the stop 44. The second section 42 can be engaged with the handle or pneumatic or electric device.

Figure 4:
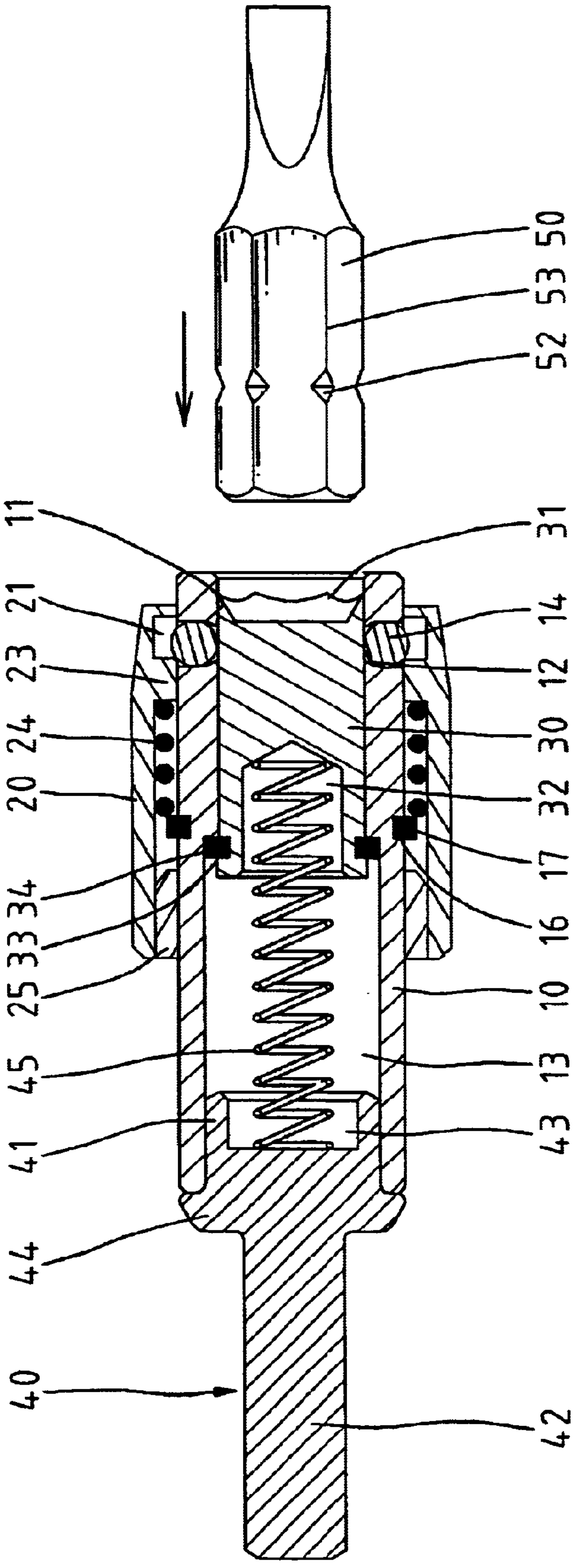
FIG. 4 is a cross-sectional view similar to FIG. 3 except for showing the chuck device to be engaged with a miniature tool bit.
Figure 5:
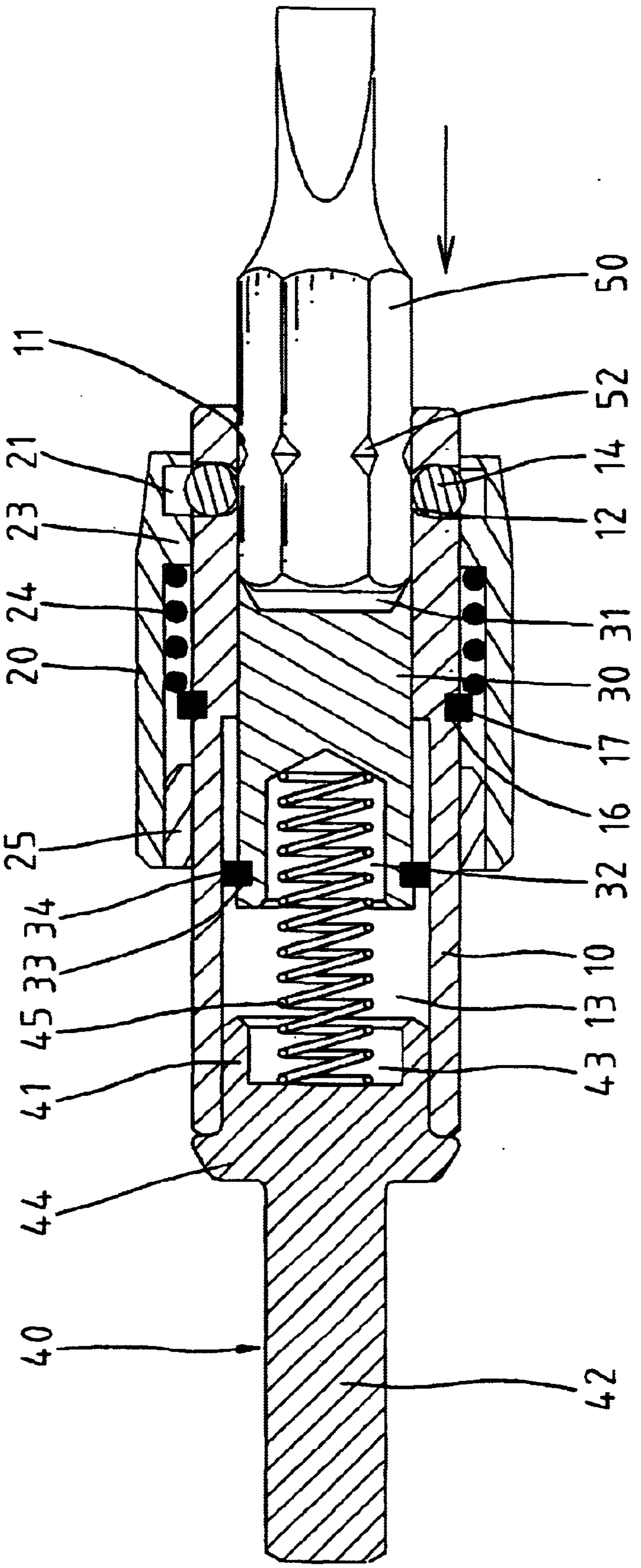
FIG. 5 is a cross-sectional view similar to FIG. 4 except for showing insertion of the miniature tool bit into the chuck device.
Figure 6:
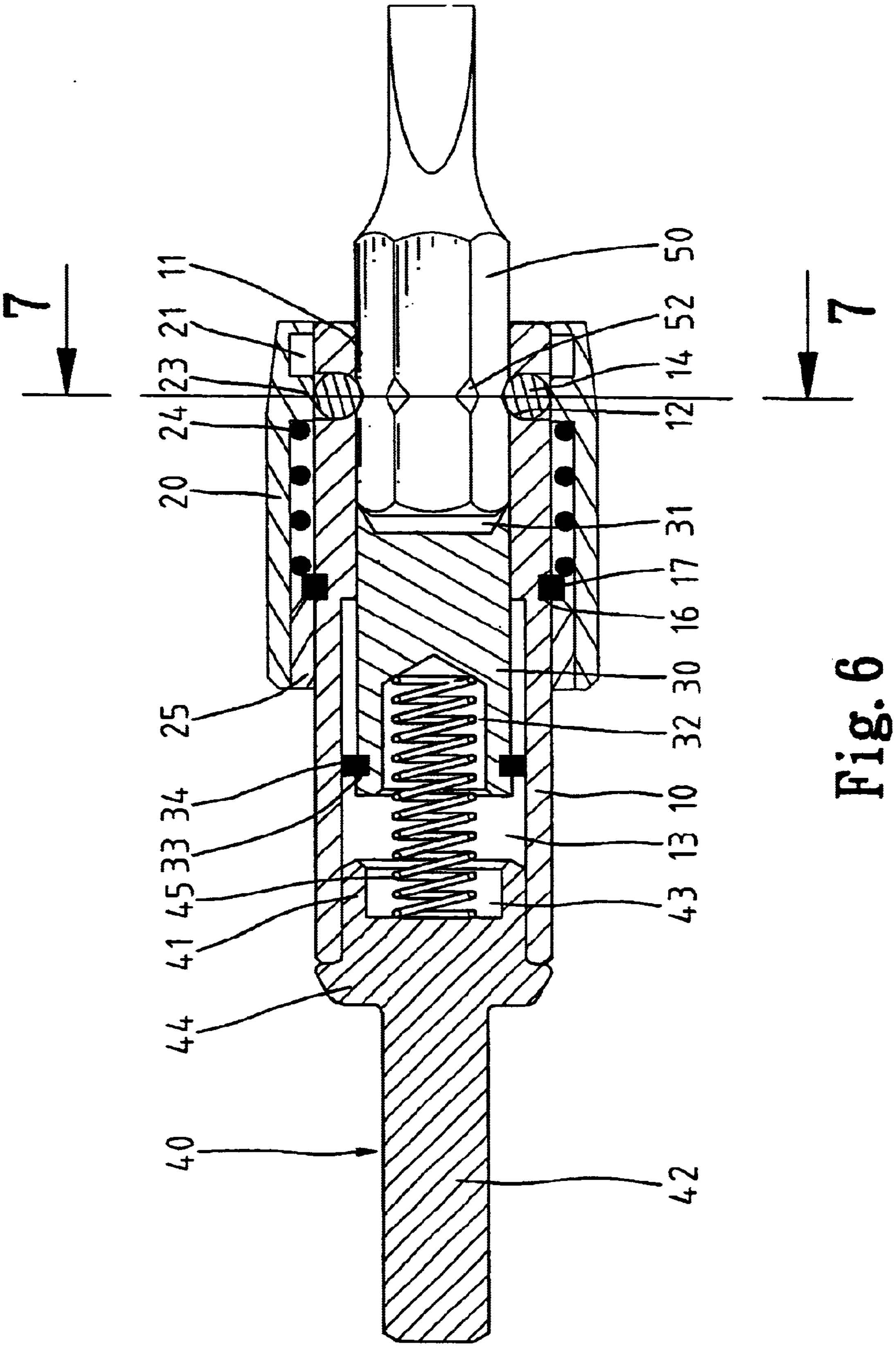
FIG. 6 is a cross-sectional view similar to FIG. 5, except for showing the chuck device engaged with the miniature tool bit.
Figure 7:
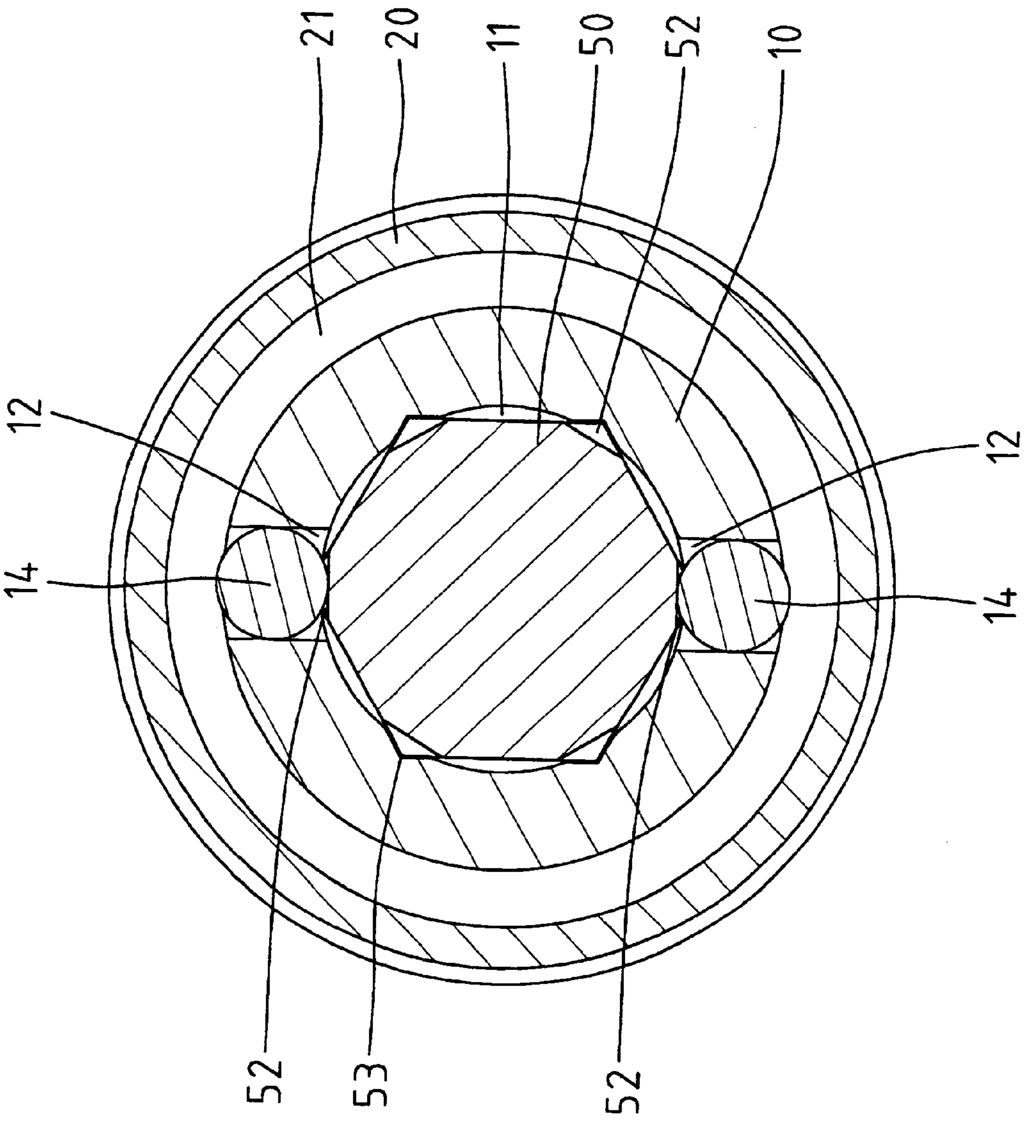
FIG. 7 is a cross-sectional view taken along a line 7—7 in FIG. 6.

The engagement of the miniature tool bit 50 with the chuck device will be described referring to FIGS. 3 to 7. Firstly, the sleeve 20 is moved relative to the socket 10 from a position as shown in FIG. 3 to a position as shown in FIG. 4. In this position, the groove 21 is aligned with the balls 14 received in the hole 12, thus allowing the balls 14 to partially enter into the annular groove 21, thus allowing the complete clearance of the balls 14 from the chamber 11. Then, the shank of the miniature tool bit 50 is inserted into the chamber 11 so as to pass by the balls 14 as shown in FIG. 5. Referring to FIGS. 6 and 7, the sleeve 20 is released, thus allowing the elastic element 24 to move the sleeve 20 so that the annular rib 23 presses the balls 14 partially into one of the recesses 52. Thus, the miniature tool bit 50 is engaged with the chuck device.

Figure 8:
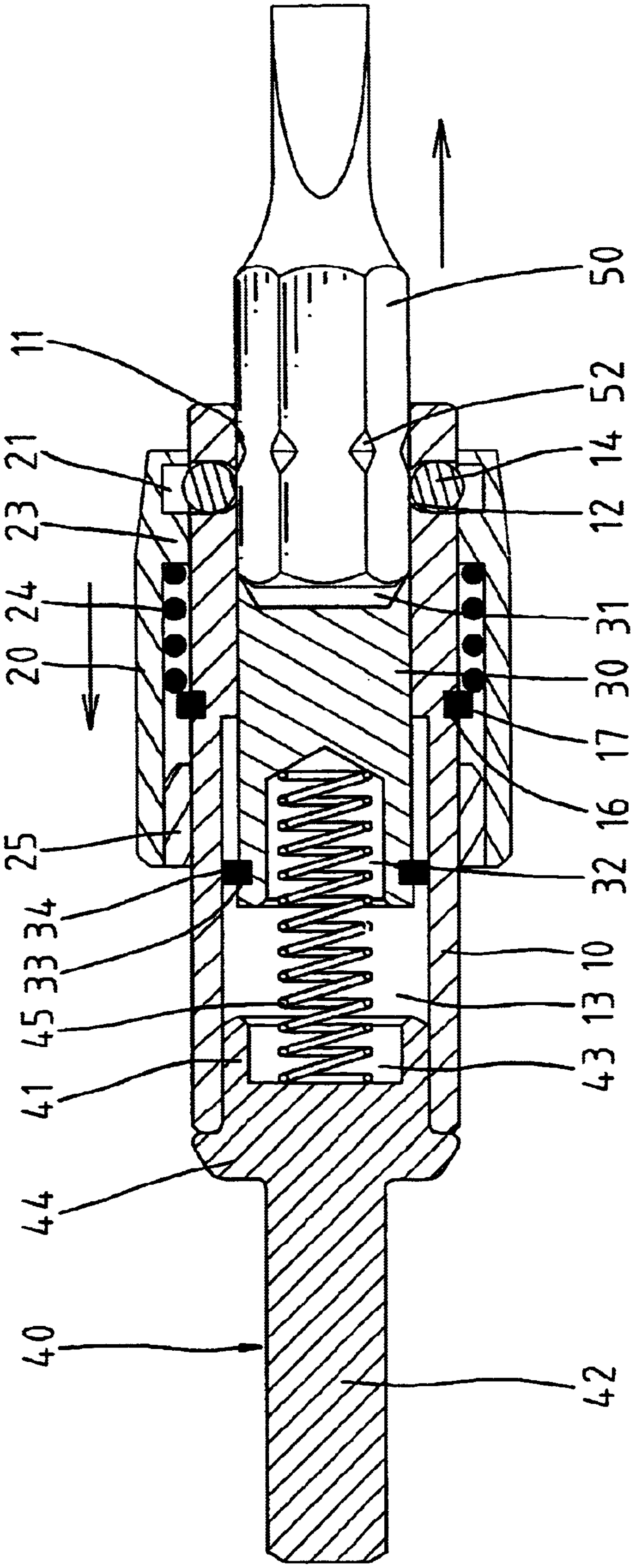
FIG. 8 is a cross-sectional view similar to FIG. 5, except for showing release of the miniature tool bit from the chuck device.

Now, the release of the miniature tool bit 50 from the chuck device will be described. Firstly, the sleeve 20 is moved from the position as shown in FIG. 6 to a position as shown in FIG. 8. In this position, the annular groove 21 is aligned with the balls 14 received in the holes 12, thus allowing the balls 14 to partially enter the annular groove 21. Biased by the elastic element 45, the pusher 30 pushes the shank of the miniature tool bit 50 while the shank of the miniature tool bit 50 forces the balls 14 completely out of the chamber 11. Thus, the miniature tool bit 50 can be removed from the chuck device.

The preferred embodiment of the present invention has been described in detail for purposes of illustration. Those skilled in the art can derive several variations from these embodiments after a study of this patent specification. Therefore, these embodiments shall not limit the scope of the present invention. The scope of the present invention can only be defined in the claims attached to and taken as a portion of this patent specification.

What is claimed is:

1. A chuck device for engagement with a miniature tool bit including a recess, the chuck device including:

a socket including a chamber that is defied therein for receiving the miniature tool bit and at least one hole defined therein in communication with the chamber;

a ball received in the at least one hole for engagement with the recess defined in the miniature tool bit;

a first ring removably mounted on and around the socket;

an elastic element mounted on the socket;

a sleeve including an annular groove defined in and an annular rib formed on an internal surface thereof, wherein the sleeve is mounted on the socket so that the elastic element is compressed between the ring and the annular rib, thus biasing the sleeve;

a second ring removably connected with the sleeve for abutting the first ring, thus retaining the sleeve on the socket; and a spindle connected with the socket.

2. The chuck device according to claim 1 wherein the chamber includes a number of slots receiving a number of corners of the miniature tool bit, with each of the number of corners each defining the recess, wherein the socket includes two holes in communication with two of the slots, wherein a ball is received in each of the holes.

3. The chuck device according to claim 1 wherein the first ring is a C-ring received in an annular groove defined in an external surface of the socket.

4. The chuck device according to claim 1 wherein the second ring is pressed into the sleeve.

5. The chuck device according to claim 1 wherein the socket includes a second chamber defined therein for receiving the spindle.

6. The chuck device according to claim 5 wherein the second chamber is in communication with the first chamber.

7. The chuck device according to claim 6 including a pusher received in the first and second chambers for pushing the miniature tool bit.

8. The chuck device according to claim 7 including a second elastic element received in the second chamber for biasing the pusher.

9. The chuck device according to claim 8 wherein the pusher includes a first recess defined therein for engagement with the miniature tool bit.

10. The chuck device according to claim 9 wherein the pusher includes a second recess defined therein for engagement with the second elastic element.

11. The chuck device according to claim 8 wherein the socket includes an annular shoulder formed between the first and second chambers, wherein the pusher includes a third ring formed thereon for abutting the annular shoulder, thus avoiding the pusher escaping from the second chamber.

12. The chuck device according to claim 11 wherein the third ring is a C-ring received in an annular groove defined in the pusher.

13. The chuck device according to claim 9 wherein the spindle includes a first section received in the second chamber and a recess defined in the first section of the spindle for engagement with the second elastic element.

* * * * *